United States Patent
Sokolik et al.

(10) Patent No.: US 10,361,931 B2
(45) Date of Patent: Jul. 23, 2019

(54) METHODS AND APPARATUS TO IDENTIFY AN INTERNET DOMAIN TO WHICH AN ENCRYPTED NETWORK COMMUNICATION IS TARGETED

(71) Applicant: AT&T Intellectual Property I, L.P., Atlanta, GA (US)

(72) Inventors: Bryan Sokolik, Rockledge, FL (US); Jeffrey Erman, Morristown, NJ (US); Herani Soewarto Brotman, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 249 days.

(21) Appl. No.: 15/199,008

(22) Filed: Jun. 30, 2016

(65) Prior Publication Data

US 2018/0006912 A1    Jan. 4, 2018

(51) Int. Cl.
| | |
|---|---|
| G06F 16/21 | (2019.01) |
| G06F 16/22 | (2019.01) |
| H04L 12/26 | (2006.01) |
| H04L 29/12 | (2006.01) |

(52) U.S. Cl.
CPC .......... *H04L 43/062* (2013.01); *G06F 16/21* (2019.01); *G06F 16/22* (2019.01); *H04L 61/1511* (2013.01)

(58) Field of Classification Search
None
See application file for complete search history.

(56) References Cited

U.S. PATENT DOCUMENTS

| | | |
|---|---|---|
| 7,778,194 B1 | 8/2010 | Yung |
| 8,387,140 B2 * | 2/2013 | Ko .................. H04L 63/0236 726/22 |
| 8,621,556 B1 | 12/2013 | Bharali et al. |
| 8,739,243 B1 | 5/2014 | Martini |
| 8,769,057 B1 | 7/2014 | Breau et al. |
| 8,869,237 B2 | 10/2014 | Byrnes |
| 9,059,984 B2 | 6/2015 | Brown et al. |

(Continued)

OTHER PUBLICATIONS

Nicholes, et al., "A Survey of Security Techniques for the Border Gateway Protocol (BGP)", IEEE Communications Surveys & Tutorials, vol. 11, No. 1, First Quarter 2009 (14 pages).

*Primary Examiner* — Nicholas R Taylor
*Assistant Examiner* — Tania M Pena-Santana
(74) *Attorney, Agent, or Firm* — Hanley, Flight & Zimmerman, LLC (57) ABSTRACT

Methods, apparatus, systems and articles of manufacture disclosed herein can be used to identify an internet domain to which an encrypted network communication is targeted. A disclosed method includes collecting a plurality of unencrypted communications with a domain name server, and identifying, by executing an instruction with a processor, network traffic patterns associated with the unencrypted communication based on a combination of routing information, internet protocol flow data, and internet transactions associated with the plurality of unencrypted communications with the domain name server. An example disclosed method further includes determining, by executing an instruction with a processor, and based on the network traffic patterns associated with the unencrypted communications, the internet domain to which the encrypted communication is to be delivered.

20 Claims, 6 Drawing Sheets

| Domain | IP Address | Cloud | CDN | AS No. |
|---|---|---|---|---|
| server1.maps.domain.com | 1.2.3.4 | FALSE | FALSE | AS294 |
| md5_hash1.domain1.com | 192.168.0.1 | | | AS456 |
| md5_hash2.domain1.com | 192.168.0.1 | | | AS456 |
| fixed_string.domain1.com | 192.168.0.1 | | | AS456 |
| server1.email.domain.com | 192.168.0.1 | | | AS294 |
| server2.email.domain.com | 192.168.0.2 | | | AS294 |
| server#.domain1.com | 192.168.0.* | | | AS456 |
| server1.cdn.com | 5.6.7.8 | FALSE | TRUE | AS1098 |
| server1.cloudprovider.com | 10.11.12.13 | TRUE | FALSE | AS11457 |

Direct connect (not CDN or cloud)
Combine
generalize
CDN
Cloud network (56) References Cited

U.S. PATENT DOCUMENTS

| | | | |
|---|---|---|---|
| 9,137,217 B1 | 9/2015 | Martini et al. | |
| 9,141,669 B2 | 9/2015 | Jellick et al. | |
| 9,197,487 B2 | 11/2015 | James et al. | |
| 9,210,122 B2 | 12/2015 | Batz et al. | |
| 2006/0112176 A1 | 5/2006 | Liu et al. | |
| 2007/0168552 A1* | 7/2007 | Alse | H04L 29/12066 |
| | | | 709/245 |
| 2007/0261112 A1* | 11/2007 | Todd | G06F 21/577 |
| | | | 726/11 |
| 2007/0283194 A1* | 12/2007 | Villella | G06F 11/3476 |
| | | | 714/57 |
| 2008/0022013 A1 | 1/2008 | Adelman et al. | |
| 2010/0153552 A1* | 6/2010 | Parekh | G06F 17/30241 |
| | | | 709/225 |
| 2010/0182918 A1 | 7/2010 | Clevy et al. | |
| 2011/0055552 A1* | 3/2011 | Francis | H04L 63/0421 |
| | | | 713/153 |
| 2011/0202756 A1* | 8/2011 | West | H04L 51/08 |
| | | | 713/152 |
| 2012/0191874 A1 | 7/2012 | Robinson et al. | |
| 2014/0129839 A1 | 5/2014 | So et al. | |
| 2014/0344331 A1 | 11/2014 | Johns et al. | |
| 2015/0120909 A1 | 4/2015 | Karthikeyan | |
| 2017/0111336 A1* | 4/2017 | Davis | H04L 63/08 |
| 2017/0310578 A1* | 10/2017 | Caputo, II | H04L 45/22 |

\* cited by examiner

METHODS AND APPARATUS TO IDENTIFY AN INTERNET DOMAIN TO WHICH AN ENCRYPTED NETWORK COMMUNICATION IS TARGETED

FIELD OF THE DISCLOSURE

This disclosure relates generally to communication networks, and, more particularly, to methods and apparatus to identify an internet domain destination of an encrypted communication traveling on a communication network.

BACKGROUND

When a user device requests internet content from a website, the user device sends a domain name system (DNS) request to a DNS server. A DNS server in receipt of such a DNS request operates to identify an Internet protocol (IP) address corresponding to a domain name included in the request. The DNS server sends the identified IP address back to the user device. In turn, the user device transmits the request for content to the website located at the IP address.

Communication network operators monitor DNS requests transmitted to domain name servers and subsequent responses to better understand existing traffic patterns/volume and to make predictions about future traffic patterns/volume. In addition, communication network operators monitor the flow of packets across the network to identify, for example, the source and destination of such packets. Such traffic pattern/volume information can then be used to provide better operational support to the network, to influence network design choices and to provide insights as to the reach and effectiveness of internet marketing campaigns.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Domain name system (DNS) servers translate domain names associated with websites to Internet Protocol (IP) addresses. When a user device makes a request for internet content located at a website of interest, the user device sends a DNS request to a DNS server. The DNS request includes the domain name of the website and the DNS server uses the domain name of the website to identify a corresponding IP address at which the website of interest is located. The process of identifying an IP address corresponding to a domain name is also referred to as resolving the domain name to an IP address. The DNS server then supplies the identified IP address to the user device for use in contacting the website to request the desired content.

In an effort to better understand internet traffic patterns and traffic volume, communication network operators often monitor and analyze DNS requests, responses to such DNS requests, and the resulting correspondence between user devices and websites having the desired content. Such correspondence between the user device and websites having desired content is referred to herein as "internet transactions" and is intended to refer generally to requests transmitted to websites via the internet for website content. In some examples the website content is a service that is accessible via the website. The transmission of such correspondence/internet transactions occurs via sets of packets.

In some instances, DNS requests transmitted to the DNS server are sampled by network operators and the IP addresses transmitted in the responses thereto are collected and stored. The resulting DNS information can be used to identify websites that are being accessed, an address at which the websites can be accessed, the frequency at which such websites are being accessed, etc. In addition to collecting information regarding DNS requests/responses, information identifying the paths traveled by the internet transactions are transmitted is also captured. The paths of the internet transactions can be monitored by tracking the flow of the sets of packets that contain/represent the internet transactions. The paths of such sets of packets traveling the communication network/internet is referred to herein as IP flow data, IP flow/stream data, IP stream data, flow data, or packet flow data, etc. Conventional routers, including, for example network edge routers are typically equipped with tools to capture information regarding the sets of packets being routed therethrough.

The collected DNS information and the IP flow data can then be used by network operators to provide better support for existing network traffic as well as to better predict future network traffic patterns and volumes.

Today's advertisers and marketers are also interested in using DNS request-based information, as well as user device location information (e.g., GPS based information), Uniform Resource Identifier ("URI") information, Uniform Resource Locator ("URL") information, and IP flow data, generally, to better understand internet traffic patterns/volumes. In particular, advertisers are willing to pay for internet network traffic information to the extent that such information helps to identify the web browsing habits of consumers. Advertisers use such consumer web browsing habits to better understand the efficacy of existing web-based advertising campaigns and to identify avenues for future web-based advertising campaigns.

However, the amount of value that can be derived from monitoring DNS server communications and IP flow data, generally, is limited. For example, a growing percentage of internet transactions are encrypted such that domain names and URIs/URLs associated with encrypted internet transactions are not decipherable by network operators that are simply monitoring the inflow and corresponding outflow of a DNS server(s) and/or a network router(s). For example, a user may access a website of an online retailer using a DNS request. Such a DNS request will often identify the name of the online retailer in the domain name such that the purpose of the DNS request can be understood. However, subsequent internet transactions made within moments of the visit to the online retailer may be encrypted (particularly when the user attempts to make an online purchase from the online retailer). Due to the indecipherable nature of the encrypted internet transactions, determining whether such encrypted transactions are related to the temporally preceding visit to the online retailer is challenging. Further, unencrypted internet transactions and encrypted internet transactions, although part of a single browsing experience with the same online retailer may involve interactions with servers having different IP addresses and, in some instances, servers associated with different autonomous systems (networks operated by different entities and, in some cases, using different protocols). Thus, without more information, it is often impossible to determine whether the encrypted internet transactions that are at least temporally relevant to the visit to the online retailer are in any way related.

Some network operators attempt to fill in the intelligence gap caused by encrypted internet transactions with catalogs supplied by Internet Service Providers or other Internet registration entities. The catalogs can be used to identify an entity that operates a server residing at an IP address to which an encrypted internet transaction is to be delivered. However, the entity listed in such a catalog may not be the same entity as the online retailer that controls the web content hosted at the server (e.g., the entity listed in the catalog may be a third party hosting service, the information in the IP catalog may be out of date, etc.).

Another technique to identify the IP addresses of websites involves using web crawlers that traverse IP addresses in search of associated website identifying information (using, for example, website scraping techniques). Although such techniques can be helpful in identifying a domain name accessed at a given IP address, the collected information often has a very short shelf life. For example, although many corporations, banking and other institutions control the hosting of their websites, many others use third party hosting services disposed in the cloud and/or content delivery networks. Such third party hosting services and/or content delivery networks typically dedicate a bank of servers accessible at a bank of IP addresses to host a corporate website/content. However, such third party hosting services use computer systems/infrastructures that are easily re-configured to meet the changing needs of their clients and therefore the geographical locations of website hosting servers and the IP addresses assigned to such third party hosted websites are extremely dynamic. As a result, maintaining a current directory of websites and corresponding IP addresses using techniques such as webcrawlers has proven a challenge. Further, many mobile applications use internet protocols, but a webcrawler is often unable to assist in deriving meaningful information from the mobile traffic.

Example techniques disclosed hereinbelow use a combination of: 1) sampled DNS requests/responses collected from DNS server communications, 2) internet transactions (both encrypted and unencrypted) collected from network probes, taps, and/or proxy servers, 3) border gateway protocol ("BGP") routing tables, 4) IP flow data collected from internet/network routers, and 5) heuristics to build an IP classifier dictionary (or database) that maps website domain names to IP addresses. Internet web server topology data collected using web crawlers may also be used as a method to validate at least some of the information stored in the IP classifier dictionary. The IP classifier dictionary can then be used to classify encrypted internet transactions that are sampled at a later time. In some examples, the encrypted internet transactions are classified by identifying an internet domain to which the encrypted transactions are targeted, and/or by identifying a type of website host that is supporting a server to which the encrypted transactions are targeted, etc. In some examples, the sampled DNS requests, the sampled internet transaction requests, IP flow information collected from network/internet routers, routing data collected from routing tables, and the heuristics are applied on an on-going basis to adjust the mappings of website domain names to IP addresses, thereby keeping the dictionary current (e.g., up-to-date). Thus, example IP classifier dictionaries and example encrypted communications classifiers disclosed herein can be used to provide greater accuracy in identifying domain names associated with encrypted internet transactions than current technologies. In addition, disclosed IP classifier dictionaries and encrypted communications classifiers can provide richer information about internet traffic, and internet traffic flow. As such, information generated using the example systems, methods, and apparatus disclosed herein: 1) can be coupled with consumer data to provide enhanced insights about internet advertising campaigns, 2) can be used to provide enhanced network capacity management, 3) can be used to improve network operations, etc.

Figure 1:
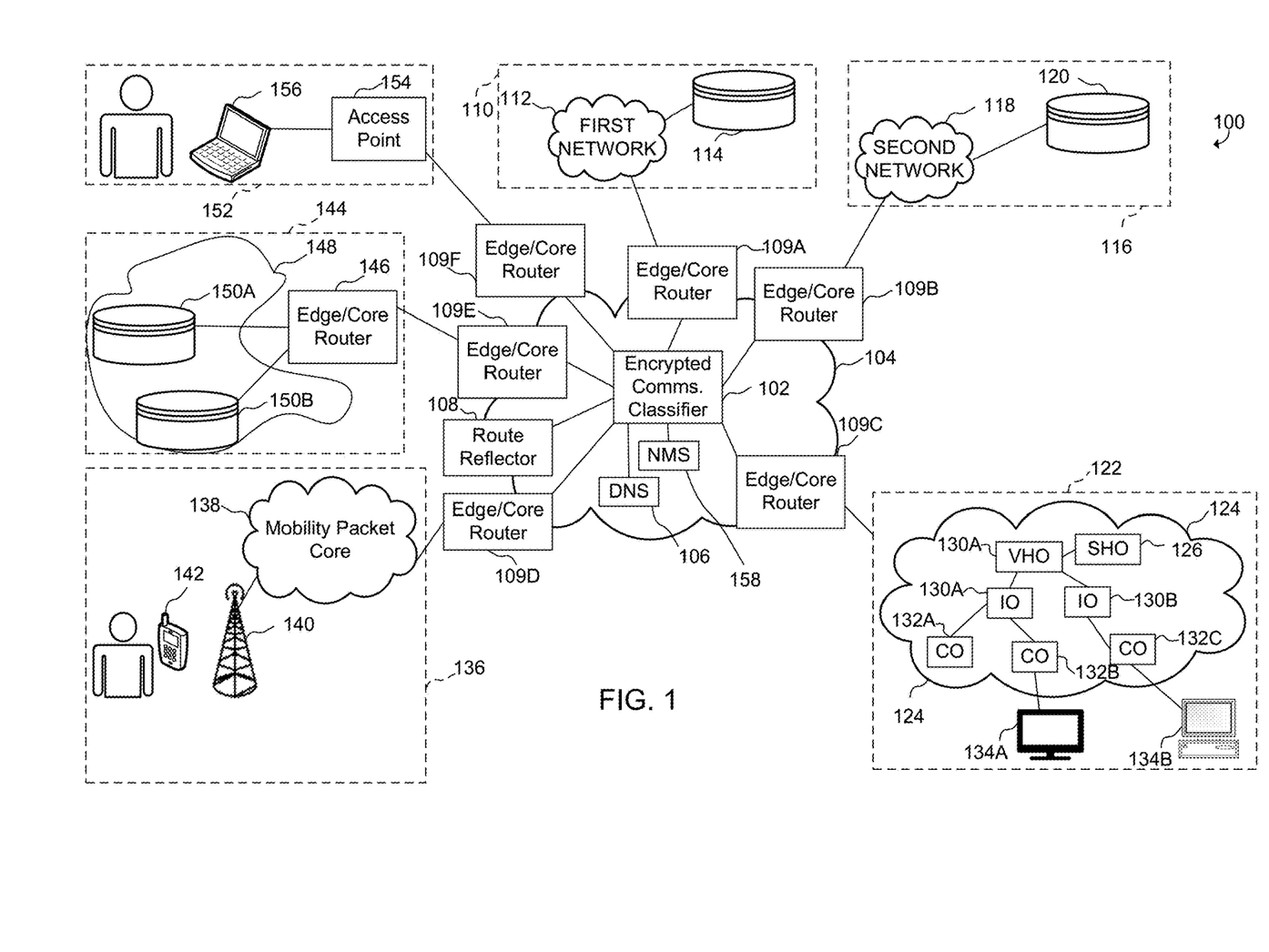
FIG. 1 illustrates an example encrypted communications classifier constructed in accordance with the teachings of this disclosure and shown in an example environment of use.

Turning to the figures, a block diagram of an example communication network 100 in which an example encrypted communications classifier 102 is deployed in accordance with the teachings of this disclosure is illustrated in FIG. 1. In some examples, the encrypted communications classifier 102 resides within an example core telecommunication network ("the core network") 104 and is communicably coupled to an example domain name system (DNS) server 106. In some examples, the core network 104 includes an example route reflector 108 and example edge routers (e.g., a first edge router 109A, a second edge router 109B, a third edge router 109C, a fourth edge router 109D, a fifth edge router 109E, and a sixth edge router 109F) by which equipment (e.g., the encrypted communications classifier 102 and the DNS server) included in the core telecommunication network 104 is communicably coupled to equipment positioned at various remote locations as described further below. In some examples, the edge routers 109A-109F use a border gateway protocol ("BGP") to transfer information/packets coming from an external customer/network to a node that is internal to the core telecommunication network 104. In some examples, the edge routers 109A-109F use BGP to transfer information/packets from a node internal to the core telecommunication network 104 to an external customer/network. In still other examples, the edge routers 109A-109F are configured to use BGP to transfer information/packets coming from a first external customer/network through the core telecommunication network 104 to a second external customer/network.

Each of the edge routers 109A-109F includes a BGP routing table that identifies blocks (ranges) of IP addresses. Each such block of IP addresses is associated with an interface. Information identifying the blocks of IP addresses and the associated interfaces are stored in the BGP routing tables. When one of the edge routers 109A-109F (e.g., the example first edge router 109A) receives information/packets to be directed to one of the IP addresses contained within a specific one of the blocks (ranges) of IP addresses, the first edge router 109A uses a first BGP routing table stored in the first edge router 109A to determine the interface associated with the specific one of the blocks (ranges) of IP addresses.

Subsequently, the first edge router 109A transmits the information/packets to the interface associated with the specific one of the blocks (ranges) of IP addresses.

The IP routing information stored in the edge routers 109A-109F also includes autonomous system numbers ("ASNs"). Each ASN represents a unique autonomous system. As used herein, an autonomous system is defined to be a network having a collection of connected routers and network devices that present a routing policy to the internet. Each ASN is typically owned/operated by a single operating entity. For example, the core telecommunication network 104 is operated by a single operating entity and is assigned a unique ASN and each of a set of external networks are operated by other operating entities and each has a unique ASN.

In some examples, an example first remote location 110 includes an example first customer access network 112 by which an example first customer processing system 114 is coupled to the core network 104 via the first edge router 109A. In some examples, the first customer processing system 114 hosts a first website. An example second remote location 116 includes an example second customer access network 118 coupled to an example second customer processing system 120 and is coupled to the core network 104 via the second edge router 109B. In some examples, the second customer processing system 120 hosts an example second website.

In some examples, an example third remote location 122 includes an example first content delivery network (CDN) 124. In some examples, the first CDN 124 is configured to provide video programming and can be implemented with a network of video distribution offices including an example super hub office 126 coupled to an example video hub office 128 which is further coupled to example intermediate offices 136A, 136B. In some examples, the intermediate offices 130A and 130B are further coupled to one or more of a set of central offices 132A, 132B, 132C which supply video content to a number of viewer locations including a first viewer location 134A, a second viewer location 134B, etc. In some examples, video content received at the super hub office 126 is distributed to the first and second viewer locations 134A, 134B via the intermediate offices 130A, 130B and the central offices 132B, 132C, respectively. In some examples, the central offices 132B, 132C are coupled via fiber optic cable to the first and second remote viewer locations 134A, 134B. In some examples, the first CDN 124 provides video programming and internet access to the first and second viewer locations 134A, 134B.

In some examples, an example fourth remote location 136 includes an example mobile communication core network ("mobile core network") 138 coupled to an example cell tower 140 in communication with an example mobile communication device 142. In some examples, an example fifth remote location 144 is coupled to the fifth edge router 108E of the core network 104 via an example cloud edge router 146 and includes an example cloud-based web hosting network 148. In some examples, the cloud-based web hosting network 148 is implemented using third party website hosting processing systems/servers 150A, 150B. In some examples, the third party website hosting processing systems/servers 150A, 150B are operated by an example third party website hosting service that provides website hosting services to commercial establishments, individuals, non-profit organizations, etc.

In some examples, an example sixth remote location 152 includes an example network access point 154 by which an example subscriber processing system 156 is coupled to the core network 104. A user operating the subscriber processing system 156 may request access to any of the websites hosted by the systems/servers at any of the first, second, third, fourth locations, etc. by using an example first web browser application installed on the subscriber processing system 156. The first web browser responds to the website access requests by transmitting a domain name associated with the requested website to the DNS server 106 via the core network 104. The DNS server 106 responds to the website access request by transmitting an IP address corresponding to the domain name to the subscriber processing system 154. In some examples, the web browser application causes IP addresses of recently visited websites to be stored at the subscriber processing system 154 for a threshold amount of time for use in subsequent requests to access the corresponding websites, thereby reducing the number of DNS requests needed to access the content. In some examples, a mobile device user operating the example mobile communication device 142 uses a second example web browser application installed on the mobile communication device 142 to request access to any of the websites hosted by the systems/servers at any of the first, second, third, fourth locations, etc. Both the user of the subscriber processing system 156 and the user of the mobile communication device 142 can also access video content from the first content delivery network 124 via respective DNS requests generated at the subscriber processing system 156 and the mobile communication device 142, respectively. The DNS requests are transmitted to the DNS server 106 which responds with IP address(es) identifying servers associated with the first content delivery network 124. In some examples, the users located at the first and second viewing locations 134A, 134B can access any of the websites hosted at any of the processing systems/servers located at any of the first, second, third, fourth locations etc., using example third and fourth respective web browser applications. The first, second, third, and fourth locations are referred to as "remote" locations only to indicate that the first, second, third, and fourth locations are positioned at geographically separate locations. Although this disclosure often speaks in terms of one DNS request, it will be understood that multiple requests are sometimes used to access a single webpage (e.g., separate requests may be sent to access data for information, advertisements, etc.)

In some examples, the example encrypted communications classifier 102 samples a configurable percentage of the DNS requests transmitted to the example DNS server 106 and the corresponding IP addresses transmitted by the DNS server 106 in response thereto. Information pertaining to the DNS requests and responses is collected and used to develop an example IP classifier dictionary 217 (see FIG. 2) (stored in an example IP classifier dictionary storage device 218) in the manner described below in connection with FIG. 2. In some examples, an example network management center (NMC) 158 tracks and analyzes traffic (e.g., internet transactions/packets) traversing the core network 104. In some examples, the example first, second, third, fourth, fifth and sixth edge routers 109A-109F collect IP flow data/information that can be used to understand the routes traveled by the sets of packets containing the internet transactions. Encrypted internet transactions detected by the network management center are supplied to the encrypted communications classifier 102 which uses the IP classifier dictionary 218 (see FIG. 2) to identify internet domains to which the encrypted internet transactions are targeted.

Figure 2:
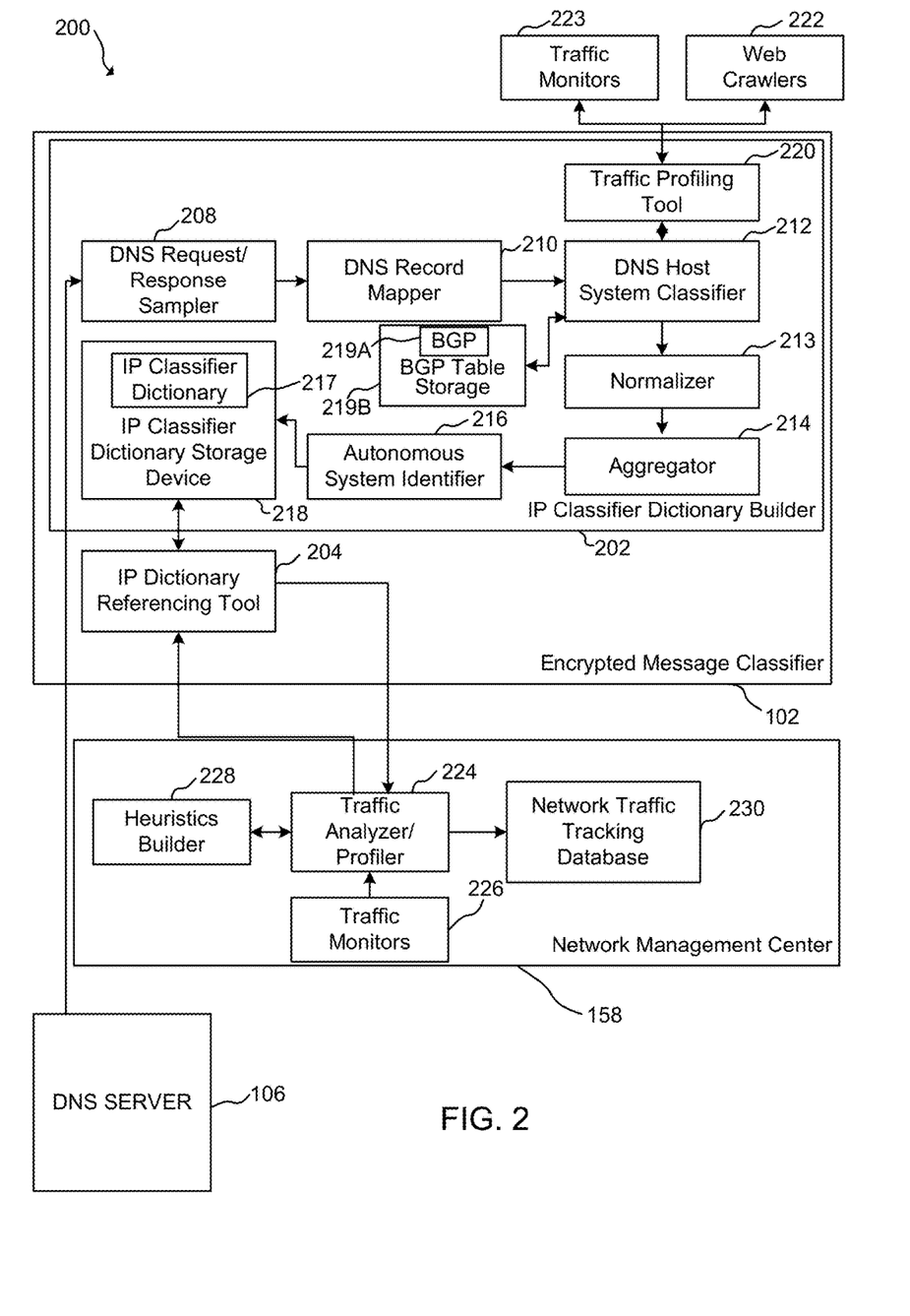
FIG. 2 is a block diagram illustrating an example implementation of the encrypted communications classifier of FIG. 1.

FIG. 2 is a block diagram of an example implementation of the encrypted communications classifier 102 of FIG. 1. In the example of FIG. 2, the encrypted communications classifier 102 includes an example IP classifier dictionary builder 202 coupled to an example IP classifier dictionary referencing tool 204. In some examples, the IP classifier dictionary builder 202 includes an example DNS request/response sampler 208, an example DNS record mapper 210, an example DNS host system classifier 212, an example normalizer 213, an example aggregator 214, an example autonomous system identifier 216, an example IP classifier dictionary 217, an example IP classifier dictionary storage device 218, and an example BGP table(s) 219A stored in an example BGP table(s) storage 219B. In some examples, the DNS host system classifier 212 is coupled to an example traffic profiling tool 220 which controls example web crawlers 222 and example traffic monitors 223. In some examples, the example network management center 158 is coupled to the IP dictionary referencing tool 204 of the encrypted communications classifier 102. In some examples, an example traffic analyzer/profiler 224 included in the network management center 158 receives information identifying internet transactions traversing the example core network 104 (see FIG. 1) from example traffic monitor(s) 226. In some examples, the example first, second, third, fourth, fifth and sixth edge routers 109A-109F and/or any other routers deployed in the communication network 100 are configured to collect IP flow data/information and to supply the IP flow data to the traffic monitor 223 and/or the traffic monitor 226. The traffic monitor(s) 223, 226 may analyze the IP flow data and supply the IP flow data to the profiling tool 220 and/or the traffic analyzer/profiler 224 for further analysis. The traffic monitor(s) 223, 226 may be disposed at any node in the core network 104. In some examples, multiple traffic monitors 223, 226 are configured to collect IP flow data from multiple ones of the first, second, third, fourth, fifth and sixth edge routers 109A-109F and any other routers deployed in the communication network 100. In some examples, the traffic monitors 223, 226 are a same set of traffic monitors.

In some examples, the IP flow data includes unidirectional stream(s) of IP packets transmitted between a source IP address and port to a unique destination IP address and port. All of the IP packets included in the stream use a same protocol. The stream of IP packets are used to realize any number of internet communications including a voice call, a video call, a file transfer, a website access, etc. In some examples, information about the individual packets is captured by any or all of the first, second, third, fourth, fifth and sixth edge routers 109A-109F (and any other network routers) and transmitted to the traffic monitors 223, 226. In some such examples, the monitors 223, 226 analyze the information contained in the packets to determine packets that are related to a same transaction (e.g., share a common source IP address and destination IP address, etc). In some examples, the monitors 223, 226 add additional information to an IP stream of packets such as a timestamp indicating a time when the first of the stream of IP packets was captured, a duration of time to transmit the complete stream of IP packets, a number of IP packets included in the stream, a number of bytes included in the stream, etc. The monitors 223, 226 supply the IP flow/stream data/information to the example traffic analyzer/profile 224 of the example network management center 158 and/or to the example traffic profiling tool 220.

In some examples, the example traffic analyzer/profiler 224 and/or the example traffic profiling tool 220 aggregates and analyzes the IP stream/flow information to identify traffic patterns among the network nodes. The traffic analyzer/profiler 224 and/or the traffic profiling tool use the analyzed traffic information to create an example network traffic tracking database 230. The information stored in the network traffic tracking database 230 is used to maintain the health of the network, to predict network performance, to provide insights as to the effectiveness of website marketing campaigns, etc.

The example traffic analyzer/profile 224 and/or the traffic profiling tool 220 supplies the identified patterns (or information pertaining thereto) to an example heuristics developer 228. The heuristics developer 228 uses the information to develop a set of heuristics based on the patterns/characteristics of the traffic. The information used by the heuristics developer 228 can include IP flow/stream data, IP flow/stream patterns, internet transactions, domain names, IP addresses etc. In some examples, the example traffic profiling tool 220 of the encrypted communications classifier 102 is configured to perform any and/or all of the operations performed by the traffic analyzer/profiler 224 and vice versa. In some examples, the traffic profiling tool 220 is implemented using the traffic analyzer/profiler 224 and/or the traffic analyzer/profiler 224 is implemented using the traffic profiling tool 220.

Upon encountering an encrypted internet transaction destined for a specific IP address, the example traffic profiling tool 220 supplies the IP address to the IP dictionary referencing tool 204 which then accesses information in the example IP classifier dictionary 217 stored in the example IP classifier dictionary storage device 218 to identify 1) an internet domain to which the encrypted internet transaction is targeted, and/or 2) other relevant information included in the IP classifier dictionary 217 (e.g., a website host type, an autonomous system number, etc.). The IP classifier dictionary referencing tool 204 supplies the information collected from the IP classifier dictionary 217 to the traffic analyzer/profiler 224 which then incorporates the information into the network traffic tracking database 230.

In some examples, the example DNS response/request sampler 208 is configured to sample a configurable number of the DNS requests/responses processed by the DNS server 106. In some examples, the DNS response/request sampler 208 can be configured to sample a threshold number of DNS requests/responses, and/or the DNS request/response sampler 208 can be configured to sample a percentage of the total number of DNS requests/responses processed within a threshold amount of time. The sampled DNS requests/responses are supplied to the example DNS record mapper 210 which extracts, from each sampled DNS request, a requested domain name and maps the requested domain name to a corresponding IP address supplied by the DNS server 106. In addition, a time stamp is collected for each sampled DNS request/response. The mapped domain name/IP address information collected for each of the DNS requests/responses is supplied to the example DNS host system classifier 212 in a set of records. Thus, the mapping activities performed by the DNS record mapper 210 provide nearly real-time information about requested domain names and the IP addresses to which the domain names resolve. In some examples, instead of sampling a configurable number of DNS requests, all or most of the DNS requests (and the responses thereto) are collected from the DNS server traffic. However, in many instances, the number of DNS requests is sufficiently large to obtain a representative collection of requests/responses using a sampling technique. It is noted that in some examples, multiple domain names map to a single IP address. In some such examples, the DNS record mapper 210 counts the number of previously collected DNS request/response samples corresponding to each of the multiple domain names and uses the domain name having the highest count as the most likely domain name for the IP address.

In some examples, the example DNS host system classifier 212 processes the records received from the example DNS record mapper 210 to identify a subset of records to analyze. The selection of the subset of records to be analyzed can be based on any criteria. In some examples, the DNS host system classifier 212 selects records associated with websites that have been most frequently visited (the websites experiencing the largest traffic flow) within a prescribed timeframe. In some such examples, the DNS host system classifier 212 can identify the IP addresses and/or domain names that occur most frequently in the records and place the records having such IP addresses and/or domain names in the subset of records to be analyzed.

In some examples, when analyzing the selected subset of the records, the DNS host system classifier 212 attempts to determine website host types for the individual IP addresses identified by the example DNS record mapper 210. An example first website host type corresponds to websites associated with content delivery network(s) ("CDN") such as, for example, the CDN 122 of FIG. 1. CDNs are designed for web sites or services that distribute content to wide audiences often across widespread geographical distances. The CDNs position the content to be distributed at various servers (often called edge servers) located in (or at the edge of) the communications network 100. Often the most popular (most frequently accessed) content is hosted furthest from the central core of the CDN 122.

An example second website host type corresponds to websites associated with a cloud-based web hosting entity such as, for example, the example cloud-based hosting network 144 of FIG. 1. Such second website host types represent third party website hosting services that operate banks of servers located in the cloud (e.g., in a data warehouse) and host content on the servers, but with limitations. For example, such cloud-based hosting services are not designed to host websites that distribute large files to large, widespread audiences. The content hosted on such websites is controlled by the operator of the website but the infrastructure used to host the content and permit access to users is controlled by the third party website hosting service.

An example third type of website host type corresponds to websites hosted by server(s) operated by the website owner (referred to as a direct connection website host type). Such third website host types represent parties that both control the website content and control the infrastructure needed to enable access to the website content via the Internet.

In some examples, the DNS host system classifier 212 turns to the example traffic profiling tool 220 to assist in determining a website host type for the domain names/IP addresses stored in the subset of records selected for analysis. In some examples, the traffic profiling tool 220 receives IP flow data collected by the traffic monitor(s) 223 from the example first, second, third, fourth, fifth and sixth edge routers 109A-109F (and any other routers configured to capture IP flow data) and uses the collected IP flow data to identify types of traffic patterns experienced at various nodes in the core network 104. The traffic profiling tool 220 can perform various profiling methods/techniques to determine traffic patterns based on IP flow data. In some examples, the traffic profiling tool 220 and/or the traffic analyzer/profiler 224 uses traffic profiling techniques to understand traffic patterns, and where possible, use the patterns to make assumptions about website host types. In some such examples, the type of traffic pattern experienced at an IP address included in one of the records may indicate that the server located at the IP address is most likely associated with the first, second or third website host type.

In some such examples, the example DNS host system classifier 212 accesses the example BGP table(s) 219A stored in the example BGP table storage 219B to identify a website host type for the IP address/domain name being analyzed. As explained above, the first, second, third, fourth, fifth and sixth edge routers 109A-109F include BGP tables used to perform routing operations. The BGP (routing) tables identify blocks (ranges) of IP addresses and an interface associated with each such block of IP addresses. As further explained above, the IP routing information stored in the BGP routers also includes autonomous system numbers ("ASNs"). Each ASN represents a unique autonomous system and each autonomous system is a network having a collection of connected routers and network devices that present a routing policy to the internet. Each ASN is typically owned/operated by a single operating entity. For example, the core network 104 is operated by a single operating entity and is assigned a unique ASN and the external networks may each have a unique ASN and may be respectively operated by a different operating entity.

In some examples, the BGP routing tables stored in the first, second, third, fourth, fifth and sixth edge routers 109A-109F are also stored in the network management center 158 and are stored in the example BGP routing table storage 219B of the example encrypted communications classifier 102. In some examples, the first, second, third, fourth, fifth and sixth edge routers 109A-109F are programmed to periodically (and/or aperiodically) transmit the BGP tables stored therein to the network management center 158 and/or the BGP table storage 219A of the IP classifier dictionary builder 202. The DNS host system classifier 212 uses the IP address associated with an IP record being analyzed to identify an ASN with which the IP address is associated. The ASN, in turn, can be used to identify a website host type of the IP address. The collected ASNs can be correlated to the entity that owns/operates the autonomous system (using information stored, for example, in the example autonomous system identifier 216 and/or the IP classifier dictionary 217) and the owner/operator can be used to identify the website host type. The information identifying the website type host is stored in the record corresponding to the domain name/IP address.

In some examples, a first DNS request associated with a first record identifies a first website having a first domain name associated with an online retailer that resolves to a first IP address. In some examples, the example DNS host system classifier 212 is configured to parse the first domain name using parsing techniques to determine whether any of the information contained in the first domain name can be used to identify (or at least provide hints) as to the website host type of the domain name, the geographical location of the server that hosts the domain name, a function or service provided by the server that hosts the domain name, etc. For instance, in this example, the first domain name identifies an online retailer. Further, the host classifier 212 and/or the IP classifier dictionary 217 may store information indicating that the online retailer identified in the domain name uses a particular website hosting service that is a first website host type. In some such examples, the DNS host system classifier 212 includes the first website host type, name of the online retailer, etc. in the first record.

In some examples, the DNS host system classifier 212 uses the domain name and the first IP address associated with the first DNS request to access the BGP table 219A to determine an ASN of an autonomous system in which a server having the IP address resides. In addition, the DNS host system classifier 212 accesses information stored in the example autonomous system identifier 216 and/or the IP classifier dictionary 217 to identify an owner/operator of the autonomous system having the ASN. In some examples, the identified ASN is operated by an entity that, based on information stored in the IP classifier dictionary 217 and/or the DNS host system classifier 212 is known to provide website hosting services on clouds of servers such that the first IP address/first domain name is determined to be associated with the second website host type. In some examples, a second DNS request associated with a second record identifies a website having a domain name that identifies a known CDN provider and resolves to a second IP address. In some such examples, the traffic profiling tool 220 may then analyze IP flow/stream data that include the first IP address and/or the second IP address to determine whether any patterns exist. For example, if unencrypted internet transactions for the online-retailer located at the first IP address are often followed by encrypted internet transactions to the known CDN provider associated with the second IP address, the traffic profiling tool 220 may determine that the server at the second website is being used to host web content associated with the online retailer and thereby assume that DNS requests that follow this pattern can be aggregated to form a single online browsing experience. In some examples, when such a determination is made, the example heuristics builder 228 may be configured to generate a rule that will classify future traffic to the first and second IP addresses occurring within a threshold amount of time as being related to a same online browsing experience.

In some examples, the example traffic profiling tool 220 selects an example first record of the subset of records being analyzed. The traffic profiling tool 220 supplies an example first IP address associated with a first domain name that is stored in the first record to the example traffic monitor 223 (or to the example traffic monitor 226). The traffic monitor 223 uses the first IP address to identify IP flow data associated with the first IP address (e.g., IP flow/stream data in which the first IP address appears as either the source or the destination IP address included in a stream of related packets). In some examples, the DNS host system classifier 212 also accesses the BGP table(s) 219A stored in the BGP table storage 219B to identify a first ASN associated with the first IP address. Further, the DNS host system classifier 212 accesses the example IP classifier dictionary 217 and/or the autonomous system identifier 216 and cross references the first ASN number against information stored in the IP classifier dictionary 217 and/or the autonomous system identifier 216 to identify an owner/operator assigned to the first ASN identified in the BGP table 219A. Further, the DNS host system classifier 212 accesses one or more stored tables to identify a website host type of the identifier owner/ operator. (In some examples, tables that associate ASNs with website host types and/or that associate owner/operators with website host types are stored in one or more of the DNS host system classifier 212, the autonomous system identifier 216, etc.) In some such examples, the first domain name includes/identifies an example online retailer. Thus, based on the information obtained, the owner/operator of the first ASN is now known to provide website hosting services to the online retailer. In some such examples, the traffic profiling tool 220 and/or the DNS host system classifier 212 updates the first record that stores the first domain name and the first IP address with information identifying the website type host (e.g., the first website host type, the second website host type, the third website host type, etc.). In some examples, the first ASN is also stored in the first record. In some examples, the traffic profiling tool 220 and/or the DNS host system classifier 212 causes the name of the owner/ operator of the first ASN (e.g., the name of the first website service provider ("website service provider 1")) to be stored in the first record.

In some examples, the IP flow/stream associated with the visit to the first website having the first IP address includes IP packets that indicate that some of the first website content (e.g., the website content associated with domain name 1 (the online retailer)) was accessed at a second IP address (and possibly multiple IP addresses). In some such examples, a first IP flow/stream data could show a first set of packets having the customer's web browser address as the source address of the first set of packets and the first IP address as the destination address of the first set of packets. Likewise, a second IP flow/stream data (detected within a threshold amount of time of the first IP flow/stream data) could show a second set of packets having the customer's web browser address as the source address of the second set of packets and the second IP address as the destination address of the second set of packets. In some examples, the first IP address identifies a server that acts as an authoritative server for the domain being sought. In some examples, the IP flow/stream associated with the visit to the first IP address/authoritative domain name server and subsequent IP flow/stream information resulting from the visit to the first IP address can be used to identify a second IP address supplied by authoritative domain name server.

Further, in some such examples, the traffic profiling tool 220 and/or the DNS host system classifier 212 accesses tables stored in the IP classifier dictionary 217 to identify an example second ASN (or possibly more than a second ASN) indicating that the second IP address is associated with an example second autonomous system operated by a second website service provider (e.g., website service provider 2). In some such examples, the traffic profiling tool 220 and/or DNS host system classifier 212 causes the second IP address and information identifying website service provider 2 (and/ or the second ASN) to be stored in the first record. All of this information coupled with information identifying whether the first set of packets and the second set of packets are associated with encrypted and/or unencrypted internet transactions can be used to develop patterns between the first online retailer and the first and second website service providers. For example, based on the disclosed example, the online retailer is driving at least some of its website traffic to the website hosting service identified by the second domain name.

In some examples, the traffic profiling tool 220 and/or the DNS host system classifier 212 can use this information to link the first domain name (e.g., domain name 1) to both the first and second servers to better understand traffic patterns to the first and second servers located at the first and second IP addresses. For example, internet transactions that result in visits to the first IP address and the second IP address occurring within a threshold amount of time can be identified as being associated with a single browsing experience to content controlled by the example retailer, even when one or more of those visits are encrypted. In this manner, the data collected and stored in the records of the IP classifier dictionary 217 can be used to identify websites accessed by encrypted traffic transactions and can make assumptions about the purpose of such encrypted traffic transactions.

In further examples, the example traffic profiling tool 220 and/or the example DNS host system classifier 212 selects an example second record from the subset of records having a second IP address and an example second domain name (domain name 2). In some such examples, the IP address is used by the traffic profiling tool 220 and/or the example DNS host system classifier 212 to cross reference information contained in the example BGP table(s) 219A to identify an ASN (a second ASN) associated with the second IP address. In some examples, the second ASN is the same as the first ASN and thus identifies the first autonomous system. As such, the first and second records are associated with website visits to a first website and a second website, respectively, both of which are hosted by the first website service provider. In some such examples, the traffic profiling tool 220 (or the traffic analyzer/profiler 224) and/or the DNS host system classifier 212 updates the second record to include the first ASN and updates the second record to include the name of the first website provider. In some such examples, the ASN can be used to access the identity of the owner/operator stored, for example, in the example autonomous system identifier 216.

In some examples, at least some of the nodes are known to be associated with a specific one of the website host types and the example traffic profiling tool 220 causes one or more of the example traffic monitors 223 to monitor the traffic patterns experienced at the nodes ("nodes of interest") that are known to be associated with specific types of website hosts. For example, the traffic profiling tool 220 may capture and analyze IP flow/stream data associated with the nodes of interest. In some such examples, the IP flow/stream data associated with the nodes of interest is analyzed to determine type(s) of traffic pattern that can be correlated to the website host type. The traffic profiling tool 220 uses such traffic patterns correlated to known website host types to develop domain/business logic and heuristics rules as described below with reference to FIG. 5. The domain/business logic and heuristics rules can be applied to traffic patterns experienced at IP addresses having a server that is operated by an unknown website host type to thereby make assumptions about the website host type.

Thus, the example DNS host system classifier 212 supplies the IP addresses identified by the example DNS record mapper 210 to the example traffic profiling tool 220. The traffic profiling tool 220 subsequently uses the traffic monitors 223 to identify traffic flow (e.g., IP flow/stream data) information for each of the IP addresses and to characterize (to the extent possible) a type of traffic flow experienced at each of the IP addresses. In addition, the traffic profiling tool 220 supplies information about the type of traffic flow experienced at the IP addresses to the DNS host system classifier 212. In some examples, the traffic profiling tool 220 supplies information to the example heuristics builder 228 which uses the information to build heuristics rules. The DNS host system classifier 212 applies the domain/business heuristics rules developed by the heuristics builder 228 to the type of traffic flow identified by the traffic profiling tool 220 to thereby determine whether the type of traffic flow indicates that the website is likely operated by a specific type of website host and, if so, what specific type of website host is indicated by the application of the domain/business logic and heuristics rules. In addition, the DNS host system classifier 212 causes the website host type information identified for each respective IP address/domain name record generated by the DNS record mapper 210 to be stored with the respective IP address/domain name record as a website host type attribute. In some example cases, the type of traffic flow experienced at a node(s) of interest having an unknown website host type will be sufficiently unlike traffic flow experienced at other nodes such that applying the domain/business logic and heuristics rules will not result in identifying a particular type of website host for the IP address. In such cases, the website host type attribute field(s) of the IP address/domain name record may be populated with information indicating that none of a first type of website host, a second type of website host, nor a third type of website host has been identified as a website host type for the IP address/domain name record. As described above, the example traffic profiling tool 220 can be implemented using the example traffic analyzer/profiler 224 of the example network management center 158 such that the traffic profiling tool 220 has access to the heuristics builder 228.

Thus, traffic patterns are discovered by analyzing the DNS requests/responses for tens, hundreds, thousands, etc. of customers over time, in the manner disclosed herein. In some instances, the discovered patterns indicate that internet transactions that otherwise appear unrelated are, in fact, related. For example, the DNS requests/responses, the internet transactions, the information stored in the BGP table(s) 219A and the IP flow/stream data, can be used to discover patterns demonstrating that network paths used for a given set of customer internet transactions. (i.e., both unencrypted and encrypted) route to a same range of IP addresses associated with a same ASN. Likewise, the same sources of information may be used to discover traffic patterns that reveal common traffic routing patterns that span multiple ASN and/or multiple IP address ranges. In some such examples, the example encrypted communication classifier 102 disclosed herein may determine that a customer browsing/web application experience includes internet transactions (encrypted and unencrypted) that route to two or more ASNs or IP address ranges. In some examples, after the example DNS host system classifier 212 populates the website host type attribute field, the example normalizer 213 normalizes the IP address/domain name records that include a URL having a random string of characters (also referred to as a hash). For example, a first IP address/domain name record (referred to as a first record) may include a first URL determined to resolve to a first IP address (e.g., "192.168.0.1") contains a first server number (e.g., "md5"), a first random string (e.g., hash1), a first domain name (e.g., "domain1"), and a first top level domain (e.g., "com"). The information included in the example first URL is partitioned by separators and appears as follows "md5 hash1.domain1.com." In addition, a second IP address/domain name record (referred to as a second record) includes a second URL that also resolves to the first IP address (e.g., "192.168.0.1"). The second URL contains the first server number (e.g., "md5"), a second random string (e.g., hash2), the first domain name (e.g., "domain1"), and the first top level domain (e.g., "com"). The information included in the example second URL is partitioned by URL separation characters (e.g., the underscore character and the dot character) and appears as follows "md5_hash2.domain1.com." When the first record and the second record are encountered by the normalizer 213, the normalizer 213 normalizes the first and second records by replacing the first URL and the second URL included in the respective first and second records with "fixed_string.domain1.com." Normalizing the IP address/domain name records in this manner prevents the size of the dictionary (e.g., the number of unique records included in the dictionary) from expanding exponentially due to the usage of random strings incorporated into URLs.

In some examples, the example record aggregator 214 aggregates the URLs associated with the IP address/domain name records generated by the example DNS record mapper 210. In some such examples, the record aggregator 214 analyzes the URLs stored in the IP address/domain name records to identify classification rules that can be used to aggregate IP address/domain name records associated with different URLs that both map to a same domain. For example, an example third IP address/domain name record (referred to as a third record) includes an example third URL determined to resolve to the first IP address (e.g., "192.168.0.1") contains an example third server number (e.g., "server1"), an example third random string (e.g., "maps"), the example first domain name (e.g., "domain1"), and the example first top level domain (e.g., "com"). The information included in the third URL is partitioned by URL separator characters and appears as follows "server1_maps.domain1.com." In addition, an example fourth IP address/domain name record (referred to as a fourth record) includes an example fourth URL determined to resolve to a second IP address (e.g., "192.168.0.2") contains an example fourth server number (e.g., "server2"), the example third random string (e.g., "maps"), the example first domain name (e.g., "domain1"), and the example first top level domain (e.g., "com"). The information included in the fourth URL is partitioned by URL separation characters and appears as follows "server2_maps.domain1.com." Upon encountering the third and fourth records, the aggregator 214 develops a rule indicating that any IP address/domain name record containing a URL taking the form "server#.domain1.com" (where "server#" represents any server having the name "server" immediately followed by a numeric character) and that resolves to an IP address taking the form "192.168.0*" (where the "*" character represents any numeric character) will be aggregated into a single record.

In some examples, the example autonomous system identifier 216 further enhances the IP address/domain name records included in the dictionary based on external data sources. In some such examples the autonomous system identifier 216 uses the BGP table(s) 219A to identify ASN's for one or more IP address/domain name records in the dictionary. As described above, the ASN associated with an IP address/domain name indicates that the IP address/domain name resides in (or is otherwise accessed via) the unique autonomous system having the unique ASN. As further described above, in some examples, cloud-based hosting companies and/or content delivery network operators operate their own autonomous system such that identifying the autonomous system and/or ASN associated with an IP address/domain name record can, in turn, be used to identify the website host type of a particular IP address/domain name. In some such examples, the autonomous system identifier 216 updates the IP address/domain name record to include the autonomous system information identified via the BGP table(s) 219A and inserts the website host type associated with the autonomous system into the IP address/domain name record. In still further examples, a first website at a first IP address will feature content that is loaded from other websites (e.g., a second website, a third website, etc.) In some such examples, IP flow/stream data collected and processed at the traffic monitors 223, 226 will reveal an internet transaction that results in access to the content at the first website having the first domain name and the first IP address and that also result in access to content at the other websites. When this occurs, the IP flow/stream data and data stored in the BGP table(s) 219A is used to identify the ASNs and the corresponding owner/operators of the ASNs is identified using, for example, the example autonomous system identifier 216. The resulting information is used to further supplement the website host type information stored in the associated records.

Figure 3:
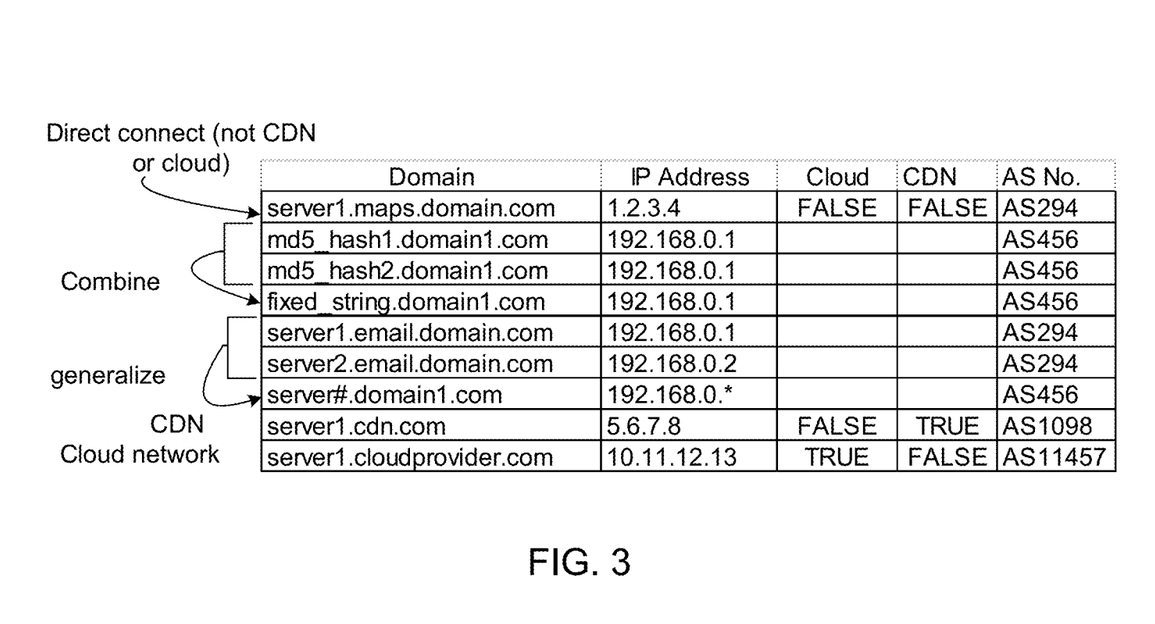
FIG. 3 is a set of example records stored in an example IP classifier dictionary created by the encrypted communication classifier of FIG. 2.

FIG. 3 illustrates an example set of records 300 processed by the example encrypted communications classifier 102 of FIG. 2 in the manner described above and stored in the example IP classifier dictionary 217 (see FIG. 2). The records are organized to include columnar information. The columns include: "Domain," "IP address," "Cloud," "CDN," and "ASN No." A first of the records identifies a first domain name "server1.maps.domain.com" and is a direct connection website host type. As a result, the "cloud" and "CDN" columns for each record are populated with "FALSE." Although both the second and third records include slightly different domain names, they can be processed by the example normalizer 213 to form the fourth record. Likewise, although the fifth and sixth records both include similar (but not identical domain names) and similar, but not identical IP addresses, they can be processed by the aggregator to form the sixth record. The seventh record is identified as being associated with a CDN website host type and the eighth record is identified as being associated with a cloud-based website host type.

While an example manner of implementing the encrypted communications classifier of FIG. 1 is illustrated in FIG. 2, one or more of the elements, processes and/or devices illustrated in FIG. 2 may be combined, divided, re-arranged, omitted, eliminated and/or implemented in any other way. Further, the example IP dictionary builder 202, the example IP dictionary referencing tool 204, the example DNS request/response sampler 208, the example DNS record mapper 210, the example DNS host system classifier 212, the example normalizer 213, the example aggregator 214, the example autonomous system identifier 216, the example IP classifier dictionary 217, the example IP classifier dictionary storage device 218, the example BGP table(s) 219A, the example BGP table(s) storage 219B, the example traffic profiling tool 220, and/or, more generally, the example encrypted communications classifier 102 of FIG. 2 may be implemented by hardware, software, firmware and/or any combination of hardware, software and/or firmware. Thus, for example, any of the example IP dictionary builder 202, the example IP dictionary referencing tool 204, the example DNS request/response sampler 208, the example DNS record mapper 210, the example DNS host system classifier 212, the example normalizer 213, the example aggregator 214, the example autonomous system identifier 216, the example IP classifier dictionary 217, the example IP classifier dictionary storage device 218, the example BGP table(s) 219A, the example BGP table(s) storage 219B, the example traffic profiling tool 220, and/or, more generally, the example encrypted communications classifier 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example IP dictionary builder 202, the example IP dictionary referencing tool 204, the example DNS request/response sampler 208, the example DNS record mapper 210, the example DNS host system classifier 212, the example normalizer 213, the example aggregator 214, the example autonomous system identifier 216, the example IP classifier dictionary 217, the example IP classifier dictionary storage device 218, the example BGP table(s) 219A, the example BGP table(s) storage 219B, the example traffic profiling tool 220, and/or, the example encrypted communications classifier 102 is/are hereby expressly defined to include a tangible computer readable storage device or storage disk such as a memory, a digital versatile disk (DVD), a compact disk (CD), a Blu-ray disk, etc. storing the software and/or firmware. Further still, the example encrypted communications classifier 102 of FIG. 1 may include one or more elements, processes and/or devices in addition to, or instead of, those illustrated in FIG. 2, and/or may include more than one of any or all of the illustrated elements, processes and devices.

Figure 4:
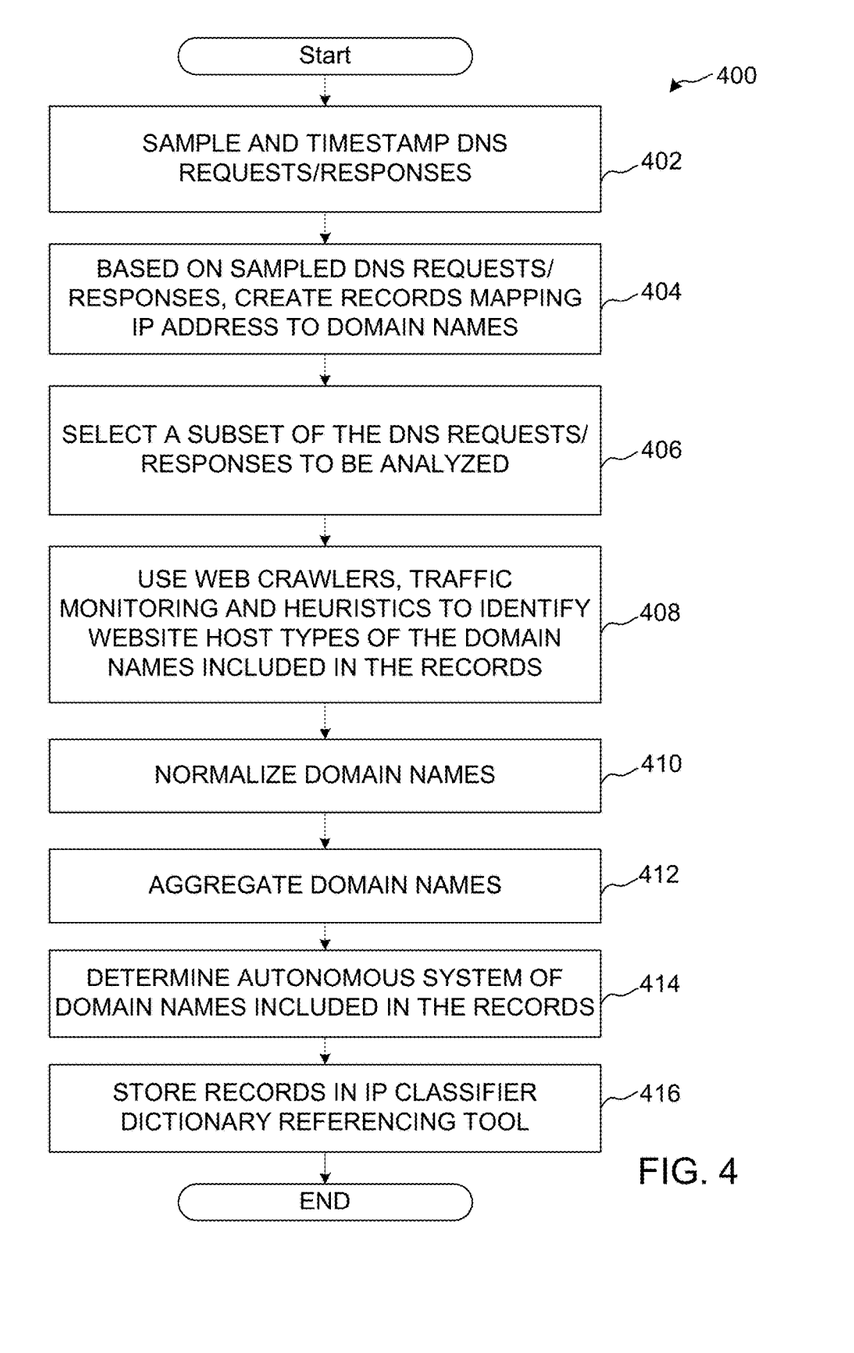
FIG. 4 is a a is a flowchart representative of example machine readable instructions which may be executed to implement the example encrypted communications classifier of FIG. 1 and/or FIG. 2 to build a classifier dictionary.

A flowchart representative of example machine readable instructions for implementing the example encrypted communications classifier 102 of FIG. 1 and FIG. 2 is shown in FIG. 4. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example encrypted communications classifier 102 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine readable instructions which may be executed to implement the example IP classifier dictionary builder 202 (see FIG. 2) of the example encrypted communications classifier 102 of FIG. 2 and/or to build an example IP classifier dictionary 217 for use in the classifying of the encrypted communications/internet transactions. In some examples, the example DNS request/response sampler 208 (see FIG. 2) of the encrypted communications classifier 102 begins building an IP classifier dictionary 217 by sampling at least some (or collecting all) DNS requests sent to the example DNS server 106 of FIG. 1 by any of a first web browser application installed on the example subscriber processing system 156 (see FIG. 1) located at the first remote location 152 (see FIG. 1), a second web browser application installed on the example mobile communication device 142 (see FIG. 1), and third and fourth web browser applications installed at the processing systems/servers located at the first and second viewing locations 134A, 134B (see FIG. 1). In some examples, a preconfigured portion of the responses (or all of the responses) generated by the DNS server 106 (block 402) are collected and correlated to corresponding DNS requests. In some examples, the DNS request/response sampler 208 can be configured to sample any desired percentage of the DNS requests/responses. After the DSN request/response sampler 208 has sampled the DNS responses/requests, the DNS requests/responses are provided to the example DNS record mapper 210 (see FIG. 2). The DNS record mapper 210 extracts from each DNS request, a requested domain name and maps the requested domain name to a corresponding IP address supplied by the DNS server 106 in response to the request for the domain name (see block 404). In addition, the DNS record mapper 210 collects a time stamp for the sampled DNS requests/responses. The DNS record mapper 210 supplies the mapped domain name/IP address information collected for each of the DNS requests/responses to the example DNS host system classifier 212 (see FIG. 2) in a set of records.

In some examples, the example DNS host system classifier 212 (see FIG. 2) selects a subset of the records to be analyzed (see block 406). In some examples, the DNS host system classifier 212 selects the records associated with the websites that were most frequently visited within a desired, prescribed timeframe. The DNS host system classifier 212 also determines a type of website host associated with each of the subset of DNS records/responses. The DNS host system classifier 212 determines a type of website host using IP flow/stream data and further using BGP routing data in the manner described above with respect to FIG. 2 (see block 408). In some examples, the IP flow/stream data is collected by any of the example edge routers 109A-109F (see FIG. 1) (or any other network router) and then supplied to the traffic monitor 223. As described hereinabove, the traffic monitor 223 processes the IP flow/stream data to identify sets of IP packets that correlate to a single internet transaction. The internet transaction may, in some examples, include a website access, a voice call, a video call, etc. The BGP data used by the DNS host system classifier 212, as further described above, is stored in the example BGP table(s) 219A. The DNS host system classifier 212 uses the identified information to determine whether the website host type associated with each internet transaction is a content delivery network ("CDN"), a cloud based website host type or a direct connect website host type.

In some examples, the example normalizer 213 (see FIG. 2) then normalizes the records (see block 410) and the example aggregator 214 (see FIG. 2) aggregates the records (see block 412) in the manner described above in connection with FIG. 2. In addition, the example autonomous system identifier 216 (see FIG. 2) uses an example autonomous system number ("ASN") identified using the BGP table 219A to identify an autonomous system associated with each of the records being processed. (As described above, in some examples, the DNS host system classifier identifies the ASN using the BGP table(s) 219A.) In addition, the autonomous system identifier 216 can be used to identify an entity that owns/operates the autonomous system based on the ASN. (see block 414). The records are supplied to the example IP classifier dictionary 217 stored in the example IP classifier dictionary storage device 218 (see FIG. 2) for storage therein (see block 416) and the method of FIG. 4 ends. In some examples, the method 400 of FIG. 4 is periodically (or aperiodically) repeated using DNS requests/responses collected over different timeframes to thereby account for the dynamic nature of the websites.

Figure 5:
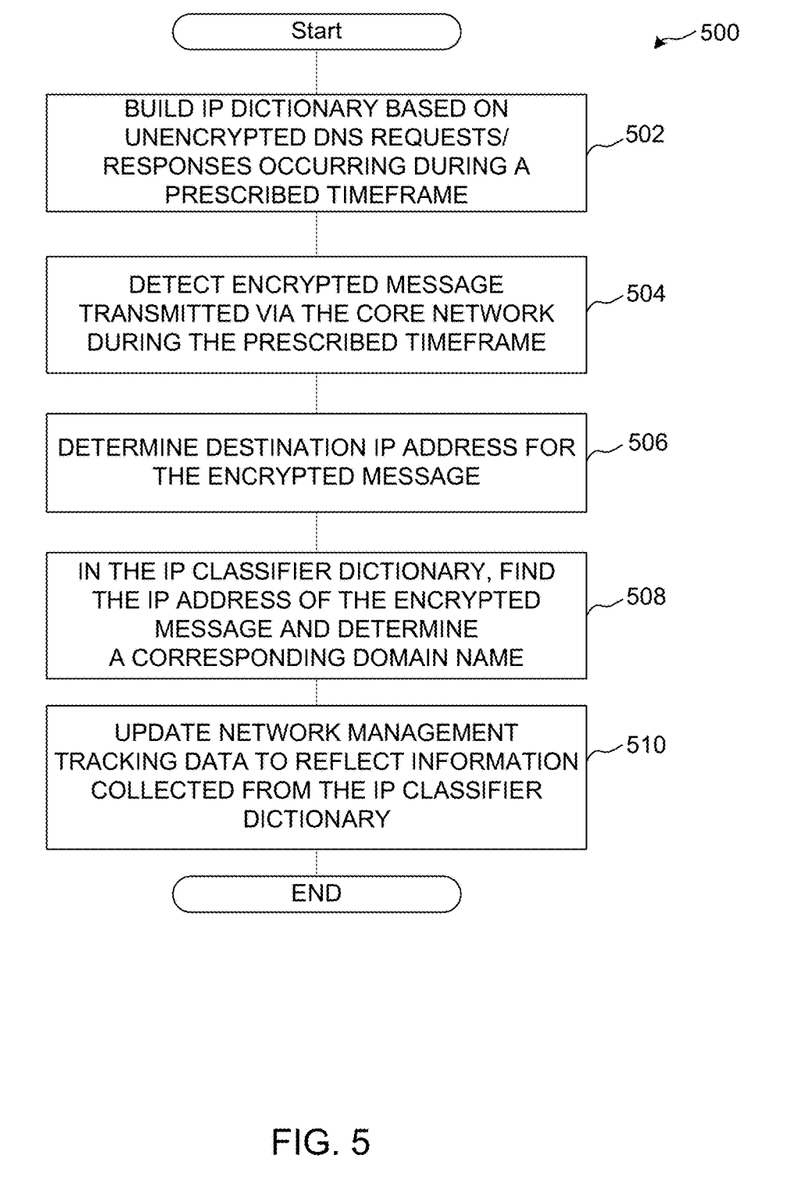
FIG. 5 is a flowchart representative of example machine readable instructions which may be executed to implement the example encrypted communications classifier of FIG. 1 and/or FIG. 2 to classify encrypted communications.

FIG. 5 is a flowchart representative of example machine readable instructions which may be executed to implement the example encrypted communications classifier 102 (see FIG. 1 and FIG. 2) and the example network management center 158 (see FIG. 1 and FIG. 2). In some examples, the method 500 begins when the IP dictionary builder 202 processes DNS requests/responses occurring during a prescribed timeframe to build an IP classifier dictionary (see block 502). In some examples, the example traffic analyzer/profiler 224 (see FIG. 2) detects an encrypted internet transaction traversing the example core network 104 (see FIG. 1) during the prescribed timeframe (see block 504). In some examples, encrypted internet transactions are detected at any of the routers/connectors by which the core network 104 is coupled to external networks. In some examples, particular ports (associated with encrypted traffic) of the routers/connectors are monitored to identify the encrypted internet transactions. The traffic analyzer/profiler 224 determines an IP address to which the encrypted internet transaction is to be delivered and supplies the IP address to the example IP dictionary referencing tool 204 (see block 506). The IP dictionary referencing tool 204 (see FIG. 2) accesses the example IP classifier dictionary 217 stored in the example IP classifier dictionary storage device 218 to identify the domain name of the IP address, the autonomous system number of the IP address, the website host type of the IP address an/or any other information stored in the IP classifier dictionary 217 for the IP address (see block 508). The traffic analyzer/profiler 224 uses the information collected from the IP classifier dictionary 217 to update the example network traffic tracking database 230 (see block 510) and the method 500 of FIG. 5 ends.

Figure 6:
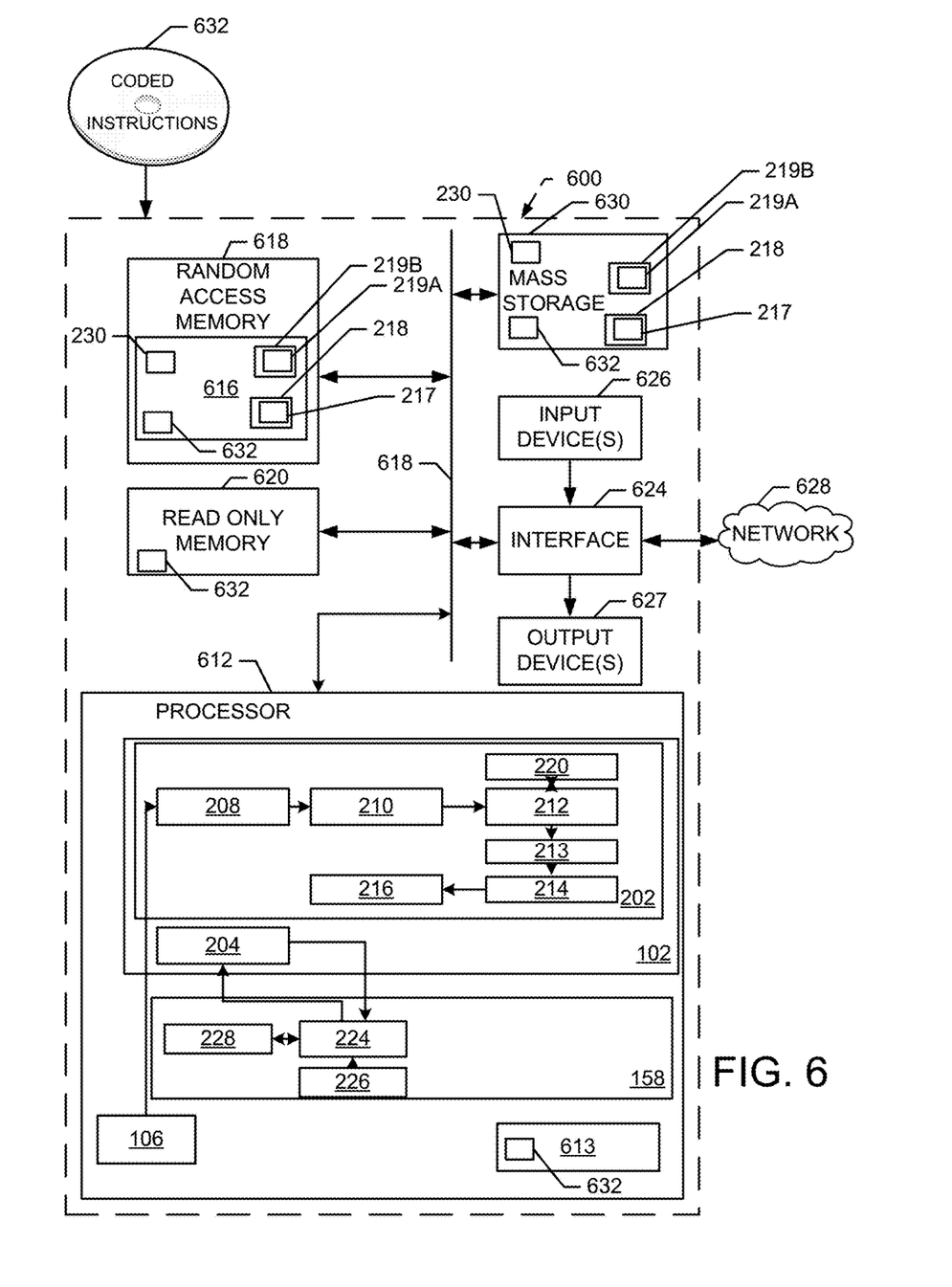
FIG. 6 is a block diagram of an example processor platform capable of executing the instructions of FIG. 4 and/or FIG. 5 to implement the example communications classifier of FIG. 1 and FIG. 2.

FIG. 6 is a block diagram of an example processor platform 600 capable of executing the instructions of FIGS. 4 and 5 to implement the encrypted communication classifier 102 and the network management center 158 of FIG. 1 and FIG. 2. The processor platform 600 can be, for example, a server, a personal computer, a mobile device (e.g., a tablet such as an iPad™), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In some examples, the example DNS server 106, example DNS request/response sampler 208, the example IP dictionary referencing tool 204, the example DNS record mapper 210, the example traffic profiling tool 220, the example DNS host system classifier 212, the example normalizer 213, the example aggregator 214, the example autonomous system identifier 216, the example heuristics builder 228, and the example traffic analyzer/profiler 224 are implemented using the example processor 612.

The processor 612 of the illustrated example includes a local memory 613 (e.g., a cache). The processor 612 of the illustrated example is in communication with a main memory including a volatile memory 616 and a non-volatile memory 620 via a bus 618. The volatile memory 614 which may be incorporated into a random access memory 618 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 616, 620 is controlled by a memory controller.

The processor platform 600 of the illustrated example also includes an interface circuit 624. The interface circuit 624 may be implemented by any type of interface standard, such as an Ethernet interface, a universal serial bus (USB), and/or a PCI express interface.

In the illustrated example, one or more input devices 626 are connected to the interface circuit 624. The input device(s) 626 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 627 are also connected to the interface circuit 624 of the illustrated example. The output devices 627 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 624 of the illustrated example, thus, typically includes a graphics driver card, a graphics driver chip or a graphics driver processor.

The interface circuit 624 of the illustrated example also includes a communication device such as a transmitter, a receiver, a transceiver, a modem and/or network interface card to facilitate exchange of data with external machines (e.g., computing devices of any kind) via a network 628 (e.g., an Ethernet connection, a digital subscriber line (DSL), a telephone line, coaxial cable, a cellular telephone system, etc.). In some examples, the network 628 implemented by the core network 104 (see FIG. 1).

The processor platform 600 of the illustrated example also includes one or more mass storage devices 630 for storing software and/or data. Examples of such mass storage devices 630 include floppy disk drives, hard drive disks, compact disk drives, Blu-ray disk drives, RAID systems, and digital versatile disk (DVD) drives.

The coded instructions 632 of FIGS. 4 and 5 may be stored in the mass storage device 630, in the volatile memory 616, in the non-volatile memory 620, and/or on a removable tangible computer readable storage medium such as a CD or DVD. In some examples, the example BGP table(s) 219A (see FIG. 2), the example BGP storage device 219B (see FIG. 2), the example IP classifier dictionary 217, the example IP classifier dictionary storage device 218, and the example network traffic tracking database 230 are implemented using the mass storage device 630. Likewise, in some examples, example BGP table(s) 219A (see FIG. 2), the example BGP storage device 219B (see FIG. 2), the example IP classifier dictionary 217, the example IP classifier dictionary storage device 218, and the example network traffic tracking database 230 are implemented using the volatile memory 616.

Example methods, systems and apparatus disclosed herein use unencrypted DNS requests/responses coupled with BGP routing data, IP flow data, traffic profiling information, etc., to build an IP classifier dictionary. The IP classifier dictionary can then be used to provide information about encrypted internet transactions including, for example, an internet domain to which an encrypted internet transactions is to be transmitted. Example systems, methods and apparatus disclosed herein also capture and analyze internet transactions (encrypted and unencrypted) as well as the flow and timing of such transactions, to identify traffic patterns that can be used to determine types of website hosts associated with internet websites. Such patterns can also be used to determine when unencrypted internet transactions and encrypted transactions are part of a same browsing experience. Such patterns can further be used to determine when a visit to a single website results in the retrieval of content from a first server associated with the single website as well as additional servers that may be coupled to autonomous systems that differ from an autonomous system of the first server. The network information obtained using methods, systems and apparatus disclosed herein can be used to support and enhance network health, better understand internet-based marketing/advertising campaigns, predict network growth, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to identify an internet domain to which an encrypted network communication is targeted, the method comprising:
    collecting a plurality of unencrypted communications with a domain name server;
    identifying, by executing an instruction with a processor, network traffic patterns associated with the plurality of unencrypted communications, based on a combination of routing information, internet protocol flow data, and internet transactions;
    mapping, by executing an instruction with the processor and based on the plurality of unencrypted communications, ones of a plurality of internet protocol addresses obtained from domain server requests included in the plurality of unencrypted communications to domain names obtained from corresponding domain server responses included in the plurality of unencrypted communications;
    comparing, by executing an instruction with a processor, a first internet protocol address associated with the encrypted network communication to the plurality of internet protocol addresses mapped to the domain names to identify a first internet domain corresponding to the first internet protocol address; and
    assigning, by executing an instruction with the processor, the first internet domain corresponding to the first internet protocol address as the internet domain to which the encrypted network communication is to be delivered.

2. The method of claim 1, wherein the internet transactions include requests for content hosted on servers at the internet protocol addresses.

3. The method of claim 1, further including:
    storing timestamps indicating corresponding times at which respective ones of the plurality of unencrypted communications were collected; and
    collecting the internet protocol flow data within a threshold amount of time of the timestamps.

4. The method of claim 1 further including:
    building a database containing records, the records identifying the domain names corresponding to the domain name server requests included in the plurality of unencrypted communications, the domain names being mapped to the internet protocol addresses supplied in the domain server responses included in the plurality of unencrypted communications; and
    accessing a routing table to identify respective autonomous system numbers associated with the plurality of internet protocol addresses.

5. The method of claim 1, wherein the routing information is border gateway protocol routing information collected from border gateway protocol routers.

6. The method of claim 1, further including determining, based on the internet domain to which the encrypted network communication is to be delivered, whether the encrypted network communication is part of a same browsing experience as one of the plurality of unencrypted communications.

7. The method of claim 1, further including adding an internet domain destination of the encrypted network communication to the network traffic patterns associated with the unencrypted communications to increase a number of network communications included in the network traffic patterns.

8. An apparatus to identify an internet domain associated with an encrypted network communication, the apparatus comprising:
    a processor; and
    a memory including machine readable instructions which, when executed by the processor, cause the processor to perform operations including:
        collecting a plurality of unencrypted network communications between network devices and a domain name server;
        identifying network traffic patterns associated with the plurality of unencrypted communications based on a combination of routing information, internet protocol flow data, and internet transactions associated with the plurality of unencrypted communications;
        mapping, based on the plurality of unencrypted network communications, ones of a plurality of internet protocol addresses obtained from domain server requests included in the plurality of unencrypted network communications to domain names obtained from corresponding domain server responses included in the plurality of unencrypted network communications;
        comparing a first internet protocol address associated with the encrypted network communication to the plurality of internet protocol addresses mapped to the domain names to identify a first internet domain corresponding to the first internet protocol address; and assigning the first internet domain mapped to the first internet protocol address as the internet domain with which the encrypted network communication is associated.

9. The apparatus of claim 8, wherein the internet transactions include requests for content hosted on servers at the internet protocol addresses.

10. The apparatus of claim 8, wherein the operations further include:

storing timestamps indicating corresponding times at which respective ones of the plurality of unencrypted network communications were collected; and collecting the internet protocol flow data within a threshold amount of time of the timestamps.

11. The apparatus of claim 8, wherein the operations further include:

building a database containing records, the records identifying the domain names corresponding to the domain name server requests included in the plurality of unencrypted network communications, the domain names being mapped to the internet protocol addresses supplied in the domain server responses included in the plurality of unencrypted network communications; and accessing a routing table to identify respective autonomous system numbers associated with the plurality of internet protocol addresses.

12. The apparatus of claim 8, wherein the routing information is border gateway protocol routing information collected from border gateway protocol routers.

13. The apparatus of claim 8, further including determining, based on the internet domain to which the encrypted network communication is to be delivered, whether the encrypted network communication is part of a same browsing experience as one of the plurality of unencrypted communications.

14. The apparatus of claim 8, further including adding an internet domain destination of the encrypted network communication to the network traffic patterns associated with the unencrypted communications to increase a number of network communications included in the network traffic patterns.

15. A tangible computer readable storage device comprising machine readable instructions which, when executed, cause a processor to perform operations including:

collecting a plurality of unencrypted network communications between network devices and a domain name server;

identifying network traffic patterns associated with the plurality of unencrypted communications based on a combination of routing information, internet protocol flow data, and internet transactions associated with the plurality of unencrypted communications between the network devices and the domain name server;

mapping, based on the plurality of unencrypted communications, ones of a plurality of internet protocol addresses obtained from domain server requests included in the plurality of unencrypted communications to domain names obtained from corresponding domain server responses included in the plurality of unencrypted communications;

comparing a first internet protocol address associated with the encrypted network communication to the plurality of internet protocol addresses mapped to the domain names to identify a first internet domain corresponding to the first internet protocol address; and assigning the first internet domain mapped to the first internet protocol address as the internet domain with which the encrypted network communication is associated.

16. The tangible computer readable storage device of claim 15, the operations further including:

storing timestamps indicating corresponding times at which respective ones of the plurality of unencrypted network communications were collected; and collecting the internet protocol flow data within a threshold amount of time of the timestamps.

17. The tangible computer readable storage device of claim 15, the operations further including:

building a database containing records, the records identifying the domain names corresponding to the domain name server requests included in the plurality of unencrypted network communications, the domain names being mapped to the internet protocol addresses supplied in the domain server responses included in the plurality of unencrypted network communications; and accessing a routing table to identify respective autonomous system numbers associated with the plurality of internet protocol addresses.

18. The tangible computer readable storage device of claim 15, wherein the routing information is border gateway protocol routing information collected from border gateway protocol routers.

19. The tangible computer readable storage device of claim 15, the operations further including, further including determining, based on the internet domain to which the encrypted network communication is to be delivered, whether the encrypted network communication is part of a same browsing experience as one of the plurality of unencrypted communications.

20. The tangible computer readable storage device of claim 15, further including adding an internet domain destination of the encrypted network communication to the network traffic patterns associated with the unencrypted communications to increase a number of network communications included in the network traffic patterns.

* * * * *